US012046848B2

(12) United States Patent
Sekino

(10) Patent No.: US 12,046,848 B2
(45) Date of Patent: Jul. 23, 2024

(54) CONNECTOR HAVING A HOUSING AND A MOUNTING MEMBER

(71) Applicant: Yazaki Corporation, Tokyo (JP)

(72) Inventor: Tetsuya Sekino, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 322 days.

(21) Appl. No.: 17/700,671

(22) Filed: Mar. 22, 2022

(65) Prior Publication Data

US 2022/0352668 A1 Nov. 3, 2022

(30) Foreign Application Priority Data

Apr. 28, 2021 (JP) ................................ 2021-076401

(51) Int. Cl.
*H01R 13/436* (2006.01)
*H01R 13/502* (2006.01)
*H01R 13/627* (2006.01)
*H01R 13/631* (2006.01)

(52) U.S. Cl.
CPC ....... *H01R 13/4362* (2013.01); *H01R 13/502* (2013.01); *H01R 13/6273* (2013.01); *H01R 13/631* (2013.01)

(58) Field of Classification Search
CPC .............. H01R 13/4362; H01R 13/502; H01R 13/6273; H01R 13/631; H01R 13/5025; H01R 13/533
See application file for complete search history.

(56) References Cited

U.S. PATENT DOCUMENTS

| | | | | |
|---|---|---|---|---|
| 5,316,504 A * | 5/1994 | Jinno | H01R 13/4223 439/752 |
| 6,464,544 B1 * | 10/2002 | Yamamoto | H01R 13/4367 439/752 |
| 7,597,580 B1 * | 10/2009 | Advey | H01R 13/533 439/272 |
| 9,484,660 B2 * | 11/2016 | Shuey | H01R 13/4362 |
| 9,634,420 B2 * | 4/2017 | Shindo | H01R 13/4362 |
| 10,109,955 B2 * | 10/2018 | Holub | H01R 13/64 |
| 10,673,169 B2 * | 6/2020 | Jabrane | H01R 13/6272 |

(Continued)

FOREIGN PATENT DOCUMENTS

| | | |
|---|---|---|
| JP | 8-3974 Y2 | 1/1996 |
| JP | 2018-174090 A | 11/2018 |

*Primary Examiner* — Abdullah A Riyami
*Assistant Examiner* — Nelson R. Burgos-Guntin
(74) *Attorney, Agent, or Firm* — Sughrue Mion, PLLC

(57) ABSTRACT

A connector includes a housing with a terminal accommodating chamber for inserting a terminal therein; and a mounting member configured to be mounted to the housing, wherein the mounting member includes: a front mask configured to cover a side of the housing on a terminal inserting direction side on which the terminal is inserted into the housing; a spacer configured to be inserted into the housing; and a hinge coupling the front mask to the spacer, wherein the spacer is configured to be locked in the housing in a temporary locked position and a final locked position of the housing, the final locked position being located deeper in the housing in an inserting direction than the temporary locked position, and wherein in a state where the spacer is positioned in the final locked position, the hinge is configured not to protrude from the housing.

3 Claims, 8 Drawing Sheets

(56) References Cited

U.S. PATENT DOCUMENTS

| | | | | |
|---|---|---|---|---|
| 2007/0167088 | A1* | 7/2007 | Ohtaka | H01R 13/4362 439/850 |
| 2017/0214179 | A1* | 7/2017 | Suzuki | H01R 13/631 |

* cited by examiner

CONNECTOR HAVING A HOUSING AND A MOUNTING MEMBER

BACKGROUND OF THE INVENTION

Technical Field

The present invention relates to a connector.

Background Art

Conventionally, a connector is disclosed which includes a housing with a plurality of terminal accommodating chambers, a plurality of terminals to be accommodated in the plurality of terminal accommodating chambers of the housing, and a front holder configured to close an opening of the housing (see e.g. Patent Document 1).

The front holder includes a holder main body and lock recess sections, the holder main body being formed in a rectangular-plate shape which allows it to close the opening of the housing, wherein the lock recess sections protrude in a plate shape from the holder main body to be locked to the housing, and the holder main body is coupled to the opening end edge of the housing via a hinge. The holder main body has insertion holes for inserting tab terminals of a partner connector therein, wherein the insertion holes are positioned in positions facing respective terminal accommodating chambers. Such a front holder is configured such that the lock recess sections are locked to the housing and the holder main body thus closes the opening of the housing so that terminals accommodated in the respective terminal accommodating chambers are prevented from being removed therefrom.

CITATION LIST

Patent Literature

Patent Document 1: JP 2018-174090 A

SUMMARY OF THE INVENTION

In the conventional connector according to Patent Document 1, however, in a state where the lock recess sections are locked to the housing and the holder main body closes the opening of the housing, the hinge protrudes from the opening end edge of the housing. Therefore, when handling a wire harness with the connector e.g. in transportation, an external force may act on the hinge, e.g. due to the protruding hinge getting caught by something. Therefore, there is the risk of damage to the hinge.

An objective of the present invention is to provide a connector which may enable suppression of an external force acting on a hinge.

In order to achieve this objective, an aspect of the present invention provides a connector including: a housing including a terminal accommodating chamber for inserting a terminal therein; and a mounting member configured to be mounted to the housing, wherein the mounting member includes: a front mask configured to cover a side of the housing in a terminal inserting direction on which the terminal is inserted into the housing; a spacer configured to be inserted into the housing; and a hinge coupling the front mask to the spacer, wherein the spacer is configured to be locked in the housing in a temporary locked position and a final locked position of the housing, the final locked position being located deeper in the housing in an inserting direction than the temporary locked position, and wherein in a state where the spacer is positioned in the final locked position, the hinge is configured not to protrude from the housing.

The present invention may enable suppression of an external force acting on the hinge.

DETAILED DESCRIPTION OF THE PREFERRED EMBODIMENTS

Figure 1:
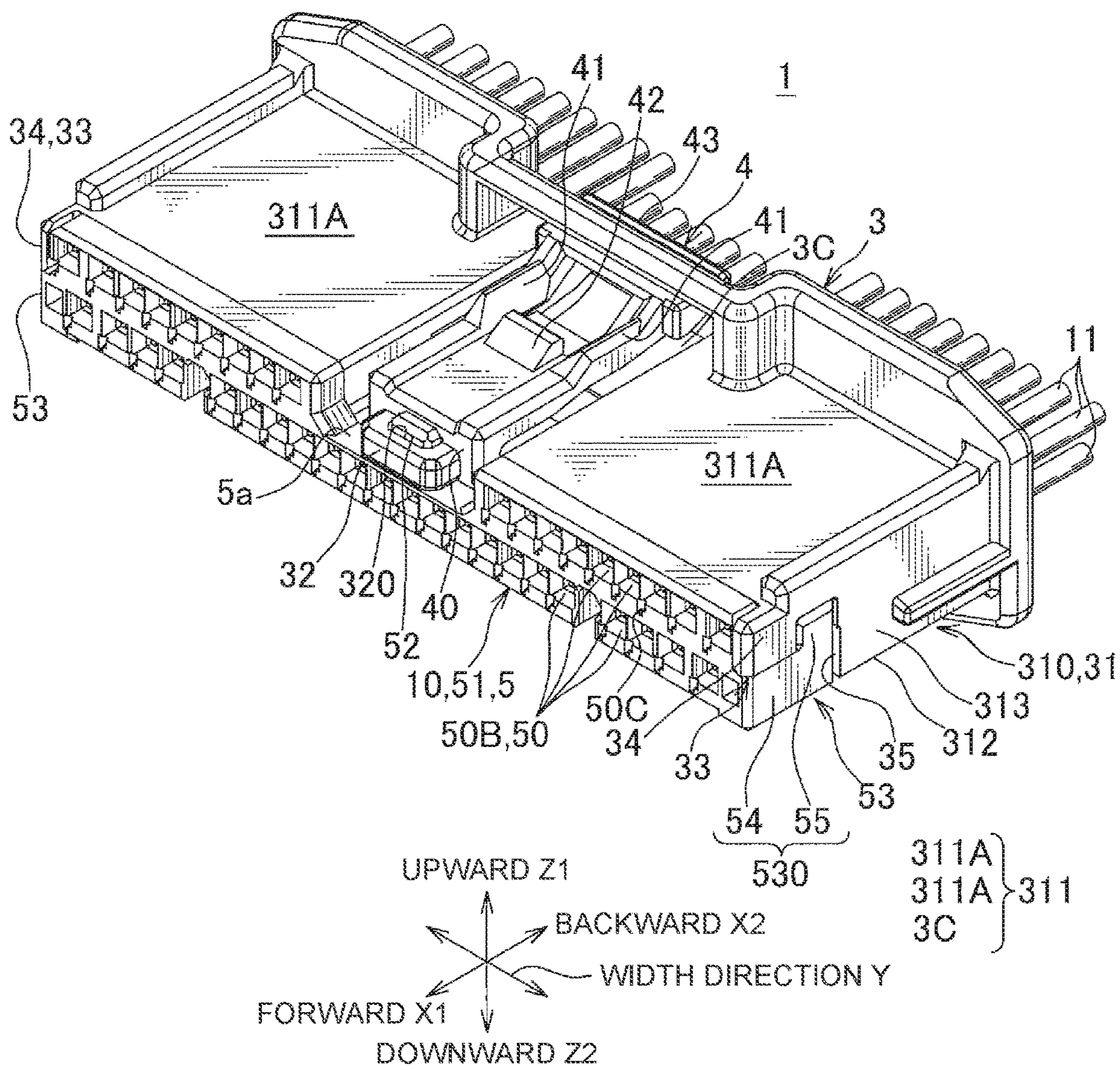
FIG. 1 is a perspective view illustrating a connector according to an embodiment of the present invention.
Figure 2:
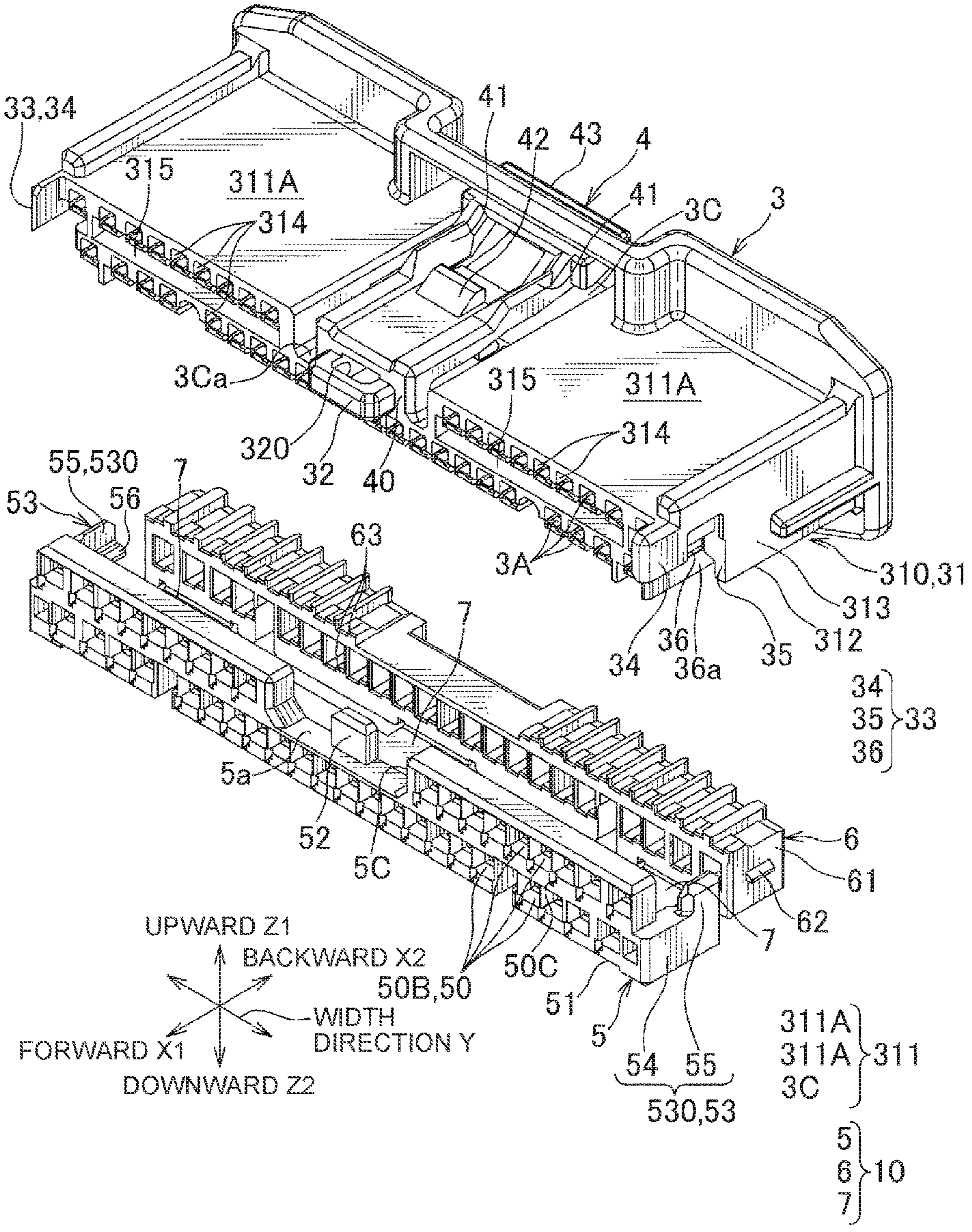
FIG. 2 is a perspective view illustrating a housing and a mounting member forming part of the connector.

Hereinafter, an embodiment of the present invention will be described with reference to FIGS. 1 to 10. FIG. 1 shows a perspective view illustrating a connector 1 according to an embodiment of the present invention. FIG. 2 shows a perspective view illustrating a housing 3 and a mounting member 10 forming part of the connector 1.

Figure 8:
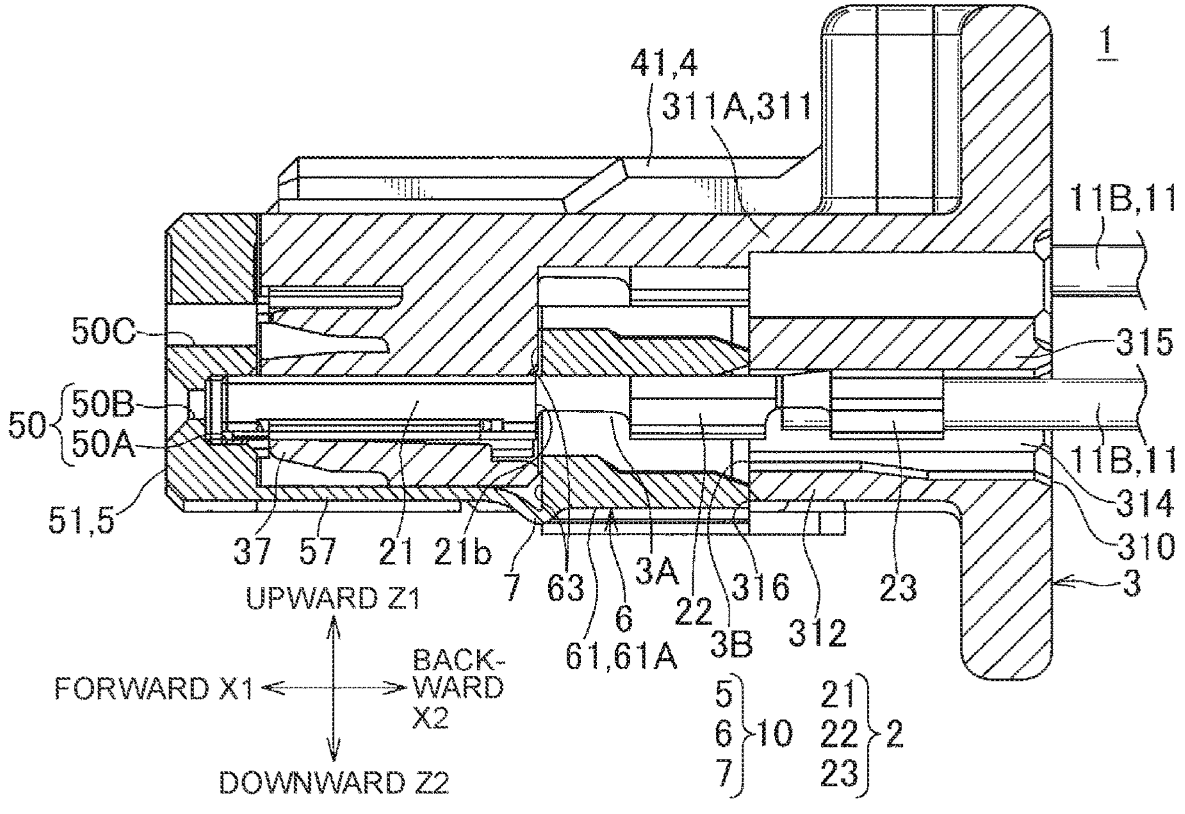
FIG. 8 is a sectional view along the line I-I in FIG. 7.

As shown in FIGS. 1 and 8, the connector 1 according to the present embodiment includes female terminal metal parts 2 as a terminal according to the claims (hereinafter referred to as "female terminals 2", see FIG. 8), the housing 3, and a mounting member 10, wherein the female terminals 2 are connected to electric wires 11 (see FIG. 8), the housing 3 includes terminal accommodating chambers 3A (see FIG. 8) for inserting the female terminals 2 therein, and the mounting member 10 is configured to be mounted to the housing 3. The connector 1 forms a terminal section of a wire harness (not shown) to be installed in an automobile. In the present embodiment, a terminal inserting direction in which the female terminals 2 are inserted may be referred to as "forward X1", a direction opposite thereto may be referred to as "backward X2", and two directions substantially orthogonal to a forward and backward direction X may be referred to as an up-down direction Z and a width direction Y. Further, one direction along the up-down direction Z may be referred to as "upward Z1", and a direction opposite thereto may be referred to as "downward Z2".

Figure 10:
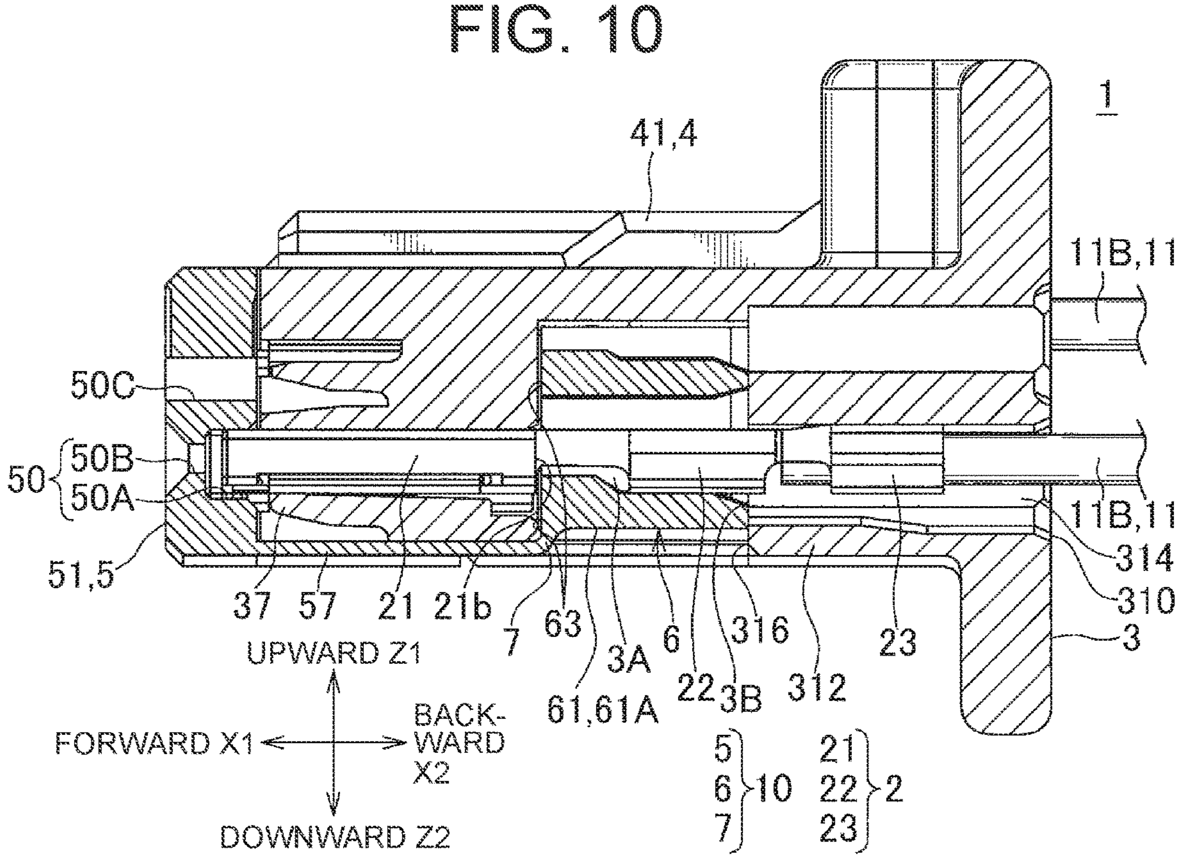
FIG. 10 is a sectional view along the line II-II in FIG. 9.

As shown in FIGS. 8, 10, the female terminals 2 are formed with an electrically conductive metal, and each have an electrical contact section 21, a core wire connecting section 22 and a coating connecting section 23, the electrical contact section 21 being configured to come into electrical contact a tab terminal of a partner connector (not shown), wherein the core wire connecting section 22 is configured to be connected to a core wire 10A (not shown) of an electric wire 11 via crimping, and the coating connecting section 23 is configured to be connected to a coating section 11B of the electric wire 11 via crimping. The electrical contact section 21 has a quadrilateral-tubular shape which has an axis coincident with the forward and backward direction X. The electrical contact section 21 is provided with a lance receiving portion (not shown) which is to be locked to a lance 37 of each of the terminal accommodating chambers 3A as described below. Such female terminals 2 are inserted into a forward X1 side by bringing front ends of the electrical contact sections 21 close to back ends of the terminal accommodating chambers 3A. It is further configured such that when the female terminals 2 have reached predetermined position in the terminal accommodating chambers 3A, tips of the female terminals 2 are accommodated in accommodating recesses 50A in the front mask 5 as shown in FIG. 8, wherein the lances 37 in the terminal accommodating chambers 3A lock the lance receiving portions. The accommodating recesses 50A will be described later. Furthermore, as shown in FIG. 10, the female terminals 2 are configured such that the back ends 21*b* of the electrical contact sections 21 are locked by terminal locking sections 63 of the spacer 6 which will be described later. Such female terminals 2 each are primarily locked by the lance 37 in each of the terminal accommodating chambers 3A, and secondarily locked by each of the terminal locking sections 63 of the spacer 6.

The housing 3 is formed e.g. from an insulating resin. As shown in FIG. 2, the housing 3 includes a housing main body 31, an engagement frame section 32 at the housing main body 31, a pair of counter-engaged portions 33, 33, and a lock arm section 4 which are integrated into the housing 3, the housing main body 31 having a housing recess 3C, wherein the engagement frame section 32 is configured to be engaged with an insertion protrusion 52 of the front mask 5 which will be described later, the pair of counter-engaged portions 33, 33 is configured to be engaged with a pair of engaged portions 53, 53 of the front mask 5 as described later, and the lock arm section 4 serves for maintaining a mated state with a partner housing of the partner connector (not shown).

As shown in FIGS. 2, 8 and 10, the housing main body 31 includes a tubular region 310 with a quadrilateral-tubular shape, a plurality of width-direction partition walls 314, and a plurality of up-down-direction partition walls 315, the tubular region 310 being formed with an upper wall region 311, a lower wall 312 and a pair of lateral walls 313, 313 (see FIG. 2), wherein the width-direction partition walls 314 partition an inner space of the tubular region 310 in the width direction Y, and the up-down-direction partition walls 315 partition spaces in the up-down direction Z, wherein the spaces are obtained by partitioning the inner space with the width-direction partition walls 314. Furthermore, the housing main body 31 includes a plurality of terminal accommodating chambers 3A (see FIGS. 8 and 10) and a spacer insertion space 3B for inserting the spacer 6 therein (see FIGS. 8 and 10), wherein the plurality of terminal accommodating chambers 3A is formed by partitioning the inner space with the above-described partition walls 314 and 315.

As shown in FIG. 2, the upper wall region 311 includes a pair of wall portions 311A, 311A, and the housing recess 3C located between the pair of wall portions 311A, 311A. The housing recess 3C is located in the middle of the housing main body 31 in the width direction Y, and extends continuously in the forward and backward direction X. A bottom face 3Ca of the housing recess 3C is located lower than upper surfaces of the pair of wall portions 311A, 311A, wherein the lock arm section 4 which will be described later is located within the housing recess 3C.

The up-down-direction partition walls 315 are arranged between the respective wall portions 311A and the lower wall 312, as shown in FIGS. 2, 8 and 10. Spaces which are obtained by partitioning the inner space with the width-direction partition walls 314 are further partitioned in the up-down direction by the up-down-direction partition walls 315, whereby the plurality of terminal accommodating chambers 3A is arranged in the width direction Y as well as in the up-down direction Z.

Each of the terminal accommodating chambers 3A is formed in a quadrilateral-tubular shape with an extending direction (axial direction of the tube) coincident with the forward and backward direction X, and configured to accommodate one of the female terminals 2, as shown in FIGS. 8 and 10. Furthermore, as shown in FIGS. 8, 10, each of the terminal accommodating chambers 3A includes the lance 37 therein for locking the female terminal 2 accommodated in the corresponding terminal accommodating chamber 3A.

Each of the lances 37 extends diagonally upward in the forward X1 direction in a natural state in the terminal accommodating chamber 3A, as shown in FIGS. 8 and 10. The lances 37 are configured such that when inserting the female terminals 2 into the terminal accommodating chambers 3A, the female terminals 2 come into contact with the lances 37 and the lances 37 are thus primarily bent, wherein when the female terminals 2 are further inserted and reach their correct positions in the respective terminal accommodating chambers 3A, the lances 37 are returned to their original state to lock the lance receiving portions of the female terminals 2.

The spacer insertion space 3B is part of the plurality of terminal accommodating chambers 3A as shown in FIGS. 8 and 10 which is cut out by removing a portion of each of the width-direction partition walls 314 and the up-down-direction partition walls 315 in the housing main body 31 so as to form one space which extends continuously in the width direction Y. As shown in FIGS. 8 and 10, the spacer insertion space 3B has an opening 316 which is formed by cutting out a portion of the lower wall 312 of the housing main body 31 so that the spacer 6 can be inserted into the spacer insertion space 3B through the opening 316.

Furthermore, the housing main body 31 includes temporary counter-locking portions and final counter-locking portions which are not shown, wherein the temporary counter-locking portions lock a pair of locked protrusions 62, 62 of the spacer 6 as described later in a temporary locked position, and the final counter-locking portions lock the pair of locked protrusions 62, 62 in a final locked position.

The engagement frame section 32 is arranged so as to protrude forward X1 from a coupling section 40 of the lock arm section 4, as shown in FIG. 2. The coupling section 40 will be described later. Inside the engagement frame section 32, an insertion hole 320 is formed which extends through the engagement frame section 32 in the up-down direction Z. The insertion hole 320 is configured to insert the insertion protrusion 52 of the front mask 5 therein which will be described later.

As shown in FIG. 2, each of the counter-engaged portions 33 includes an opposite wall 34, a cut-out portion 35 and an engagement recess 36, wherein the opposite walls 34 are opposed to each other in the width direction Y to position the front mask 5 therebetween, and the cut-out portions 35 are formed by removing a portion of front ends of the respective lateral walls 313 to receive engaged portion main bodies 530 of the front mask 5 which will be described later, wherein each of the engagement recesses 36 is to be engaged with an engagement projection 56 of the front mask 5 which will be described later. The opposite walls 34 extend forward X1 continuously from the respective lateral walls 313 and protrude on the forward X1 side of the housing main body 31. The engagement recesses 36 are formed in a concave groove shape in bottom faces 36*a* in the cut-out portions 35 (outer faces in the width direction Y).

The lock arm section 4 includes the coupling section 40, a pair of arms 41, 41, a locking protrusion 42 and an operating section 43 as shown in FIGS. 1 and 2, the coupling section 40 is raised from the bottom face 3Ca of the housing recess 3C, wherein the pair of arms 41, 41 is continuous with the coupling section 40 and extends backward X2, the locking protrusion 42 protrudes upward Z1 from a portion connecting the pair of arms 41, 41 in the width direction Y, and the operating section 43 is provided at back ends of the pair of arms 41, 41. This lock arm section 4 is configured such that when mating the housing 3 with the partner housing (not shown), the locking protrusion 42 is engaged with a locked portion of the partner housing. Furthermore, the locking protrusion 42 of the housing 3 and the locked portion of the partner housing are configured to be disengaged from each other by pushing down the operating section 43 and thereby bending the pair of arms 41, 41.

Figure 3:
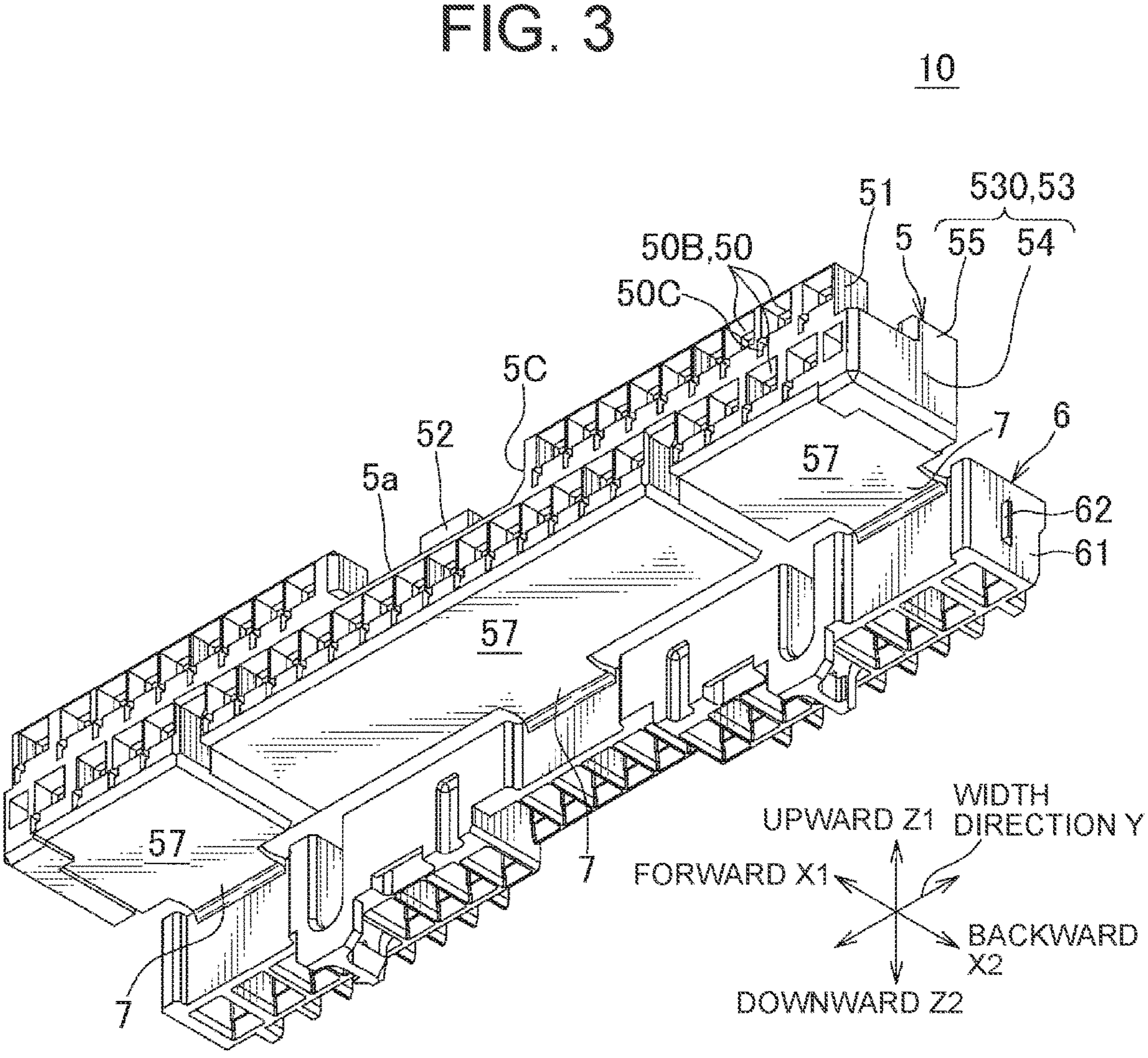
FIG. 3 is a perspective view illustrating the mounting member.

As shown in FIGS. 2 and 3, the mounting member 10 includes a front mask 5 for covering a front end face of the housing main body 31, the spacer 6 to be inserted into the spacer insertion space 3B in the housing main body 31, and hinges 7 coupling the front mask 5 to the spacer 6, wherein the front mask 5, spacer 6 and hinges 7 are integrated into the mounting member 10.

The front mask 5 includes a plate-shaped mask main body 51, the insertion protrusion 52 (see FIG. 3), the pair of engaged portions 53, 53 (see FIG. 3), and mask plate sections 57 as shown in FIGS. 3, 8 and 10, the mask main body 51 having a plurality of terminal hole portions 50, wherein the insertion protrusion 52 is to be inserted into the insertion hole 320 in the engagement frame section 32 of the housing 3, the pair of engaged portions 53, 53 extends backward X2 from the mask main body 51 and is to be engaged with the pair of counter-engaged portions 33, 33, and the mask plate sections 57 extend in a plate shape backward X2 from the mask main body 51.

As shown in FIGS. 3, 8 and 10, the mask main body 51 has the plurality of terminal hole portions 50 and a lance release hole(s) 50C formed therein, wherein the lance release hole 50C is configured to insert a lance release jig (not shown) therethrough. As shown in FIGS. 8 and 10, the terminal hole portions 50 are placed in positions facing the forward X1 side the respective terminal accommodating chambers 3A, wherein each of the terminal hole portions 50 has an accommodating recess 50A and a tab terminal insertion hole 50B, the accommodating recess 50A extending forward X1 continuously from each terminal accommodating chamber 3A and configured to accommodate the tip of the female terminal 2, and the tab terminal insertion hole 50B being extending forward X1 continuously from the accommodating recess 50A and configured to insert a tab terminal of the partner connector therethrough. The tab terminal insertion hole 50B has a radial dimension which is smaller than a radial dimension of the accommodating recess 50A. By mounting the mask main body 51 to the housing main body 31, the terminal hole portions 50 in the mask main body 51 are positioned in positions facing the forward X1 side of the respective terminal accommodating chambers 3A in the housing 3 so that the tips of the female terminals 2 are allowed to be inserted to reach the accommodating recesses 50A in the front mask 5.

Figure 4:
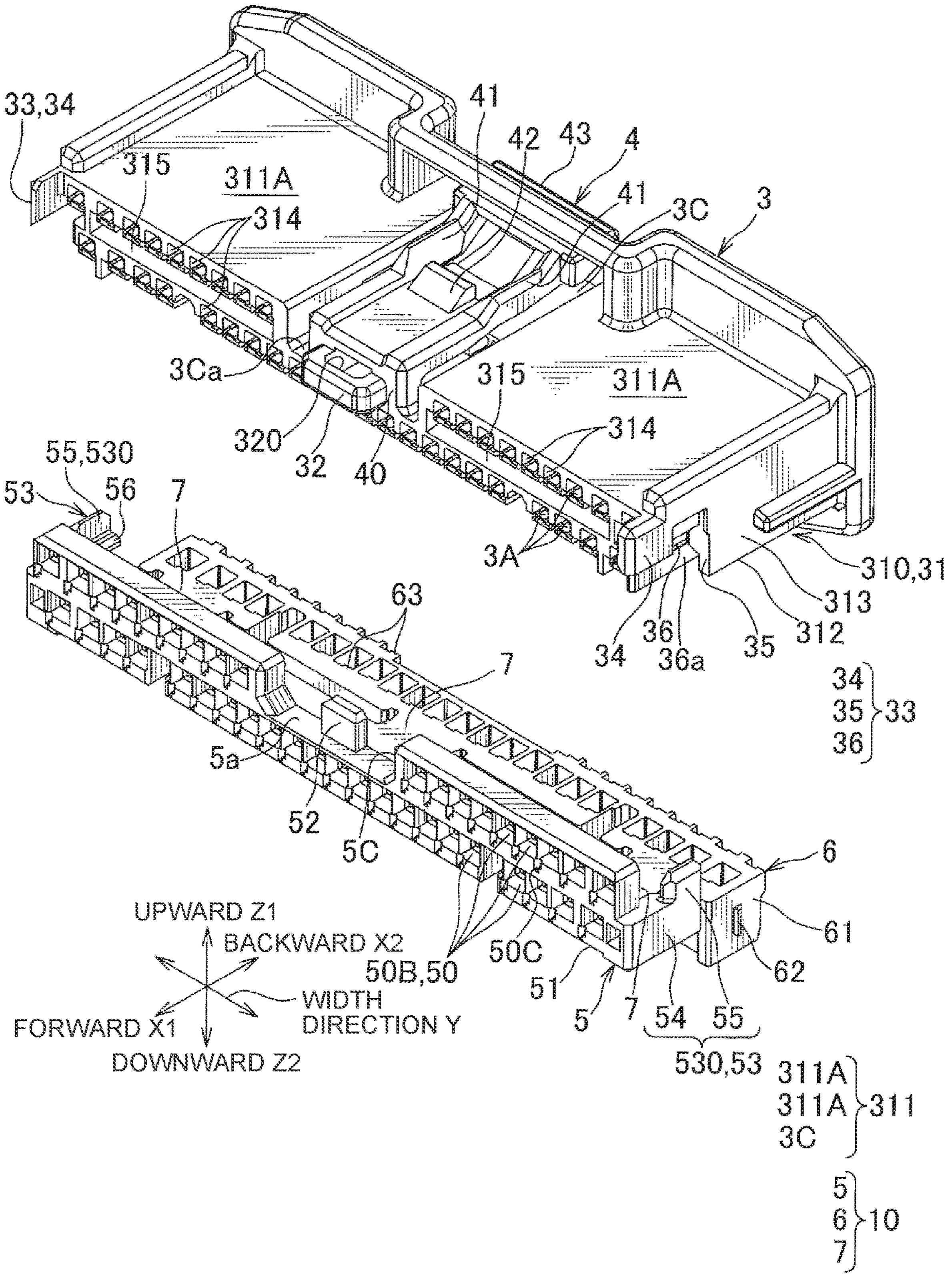
FIG. 4 is a perspective view illustrating how the mounting member is mounted to the housing.

Furthermore, the mask main body 51 has a mask recess 5C as shown in FIGS. 2 to 4, the mask recess 5C being formed by removing an upper end portion in the middle in the width direction Y, wherein the insertion protrusion 52 protrudes upward Z1 from a bottom face 5*a* of the mask recess 5C.

The pair of engaged portions 53, 53 has a pair of backward protruding elements 54, 54, upward protruding elements 55 and the engagement projections 56 as shown in FIGS. 2 to 4, the pair of backward protruding elements 54, 54 protruding in a plate shape backward X2 from lateral portions of the mask main body 51 and the upward protruding elements 55 protruding upward from tips of the respective backward protruding elements 54, wherein the engagement projections 56 protrude inwardly from the respective backward protruding elements 54 in the width direction Y to be engaged with the engagement recesses 36 in the housing main body 31. The backward protruding elements 54 and upward protruding elements 55 may be collectively referred to as "engaged portion main bodies 530". Such engaged portions 53 are provided such that the engaged portion main bodies 530 are fitted in the cut-out portions 35 in the counter-engaged portions 33 and the engagement projections 56 are engaged with the engagement recesses 36.

The mask plate sections 57 are continuous with a bottom of the mask main body 51 and extend to a back end of each of the engaged portions 53, as shown in FIGS. 3, 8 and 10.

As shown in FIGS. 2 to 4, the spacer 6 includes a spacer main body 61 with a cuboid-like shape and the pair of locked protrusions 62, 62, the spacer main body 61 being configured to be inserted into the spacer insertion space 3B in the housing main body 31, wherein the pair of locked protrusions 62, 62 protrudes in the width direction Y from the spacer main body 61 and is lockable with the temporary counter-locking portions and with the final counter-locking portions of the housing main body 31.

As shown in FIGS. 2 to 4, the spacer main body 61 has partitions formed therein so that the partitions form part of the respective terminal accommodating chambers 3A, wherein the spacer main body 61 further includes the terminal locking sections 63 for locking the respective female terminals 2 accommodated in the respective terminal accommodating chambers 3A. The spacer main body 61 is configured to be pivotable by bending the hinges 7 which will be described below, wherein the spacer main body 61 is configured to be positioned in the temporary locked position by being pivoted from the state shown in FIGS. 4 and 5 and then by being inserted into the spacer insertion space 3B in the housing main body 31 in the state shown in FIG. 6. The terminal locking sections 63 are disposed at a front end face of the spacer main body 61, as shown in FIGS. 8 and 10. As shown in FIGS. 8 and 10, the terminal locking sections 63 limit movement of the respective female terminals 2 in the backward X2 direction by locking the back ends 21*b* of the electrical contact sections 21 of the respective female terminals 2 when the spacer main body 61 is positioned in the final locked position as described later. This prevents the female terminals 2 from being removed from the respective terminal accommodating chambers 3A.

As shown in FIGS. 2 to 4, the pair of locked protrusions 62, 62 are configured such that the spacer main body 61 is positioned in the temporary locked position by locking the locked protrusions 62, 62 to the temporary counter-locking portions of the housing 3, wherein the spacer main body 61 is positioned in the final locked position by locking the locked protrusions 62, 62 to the final counter-locking portions of the housing 3. In this manner, the spacer main body 61 is configured to be movable between the temporary locked position and the final locked position.

When the spacer 6 is positioned in the temporary locked position, a lower face 61A of the spacer main body 61 protrudes downward Z2 from the lower wall 312 of the housing main body 31 as shown in FIG. 8, so that the female terminals 2 are allowed to be inserted into the terminal accommodating chambers 3A. Furthermore, when the spacer 6 is positioned in the final locked position, the spacer main body 61 is accommodated in the spacer insertion space 3B as shown in FIG. 10, so that the lower face 61A of the spacer main body 61 is positioned further upward Z1 than the lower wall 312 of the housing main body 31 and the terminal locking sections 63 lock the back ends 21*b* of the electrical contact sections 21 of the respective female terminals 2, whereby each of the female terminals 2 is prevented from being removed from each of the terminal accommodating chambers 3A. This means that when the spacer 6 is positioned in the final locked position, the spacer main body 61 is in a state where it does not protrude from the lower wall 312 of the housing main body 31.

As shown in FIGS. 8 and 10, the hinges 7 are disposed in three positions so as to couple the front mask 5 to the spacer 6, the three positions being spaced in the width direction Y, wherein the hinges 7 are continuous with the mask plate section 57 of the front mask 5 and with a front end of the lower face 61A of the spacer main body 61. Furthermore, the hinges 7 are configured with such a length that even when moving the spacer 6 to the final locked position from the temporary locked position, no tensile force is applied to the hinges 7 themselves between the mask plate section 57 and the spacer 6. When the spacer 6 is positioned in the temporary locked position in a state of the front mask 5 which is locked to the housing 3, the hinges 7 are curved protruding downward Z2 as shown in FIG. 8. On the other hand, when the spacer 6 is positioned in the final locked position after being pushed from the temporary locked position, the hinges 7 are extended from the curved state and thus positioned further upward Z1 than the lower wall 312 of the housing main body 31, as shown in FIG. 10. This means that when the spacer 6 is positioned in the final locked position, the hinges 7 are in a state where they do not protrude from the lower wall 312 of the housing main body 31.

Next, a procedure for assembling the connector 1 will be described with reference to FIGS. 4 to 10.

Figure 5:
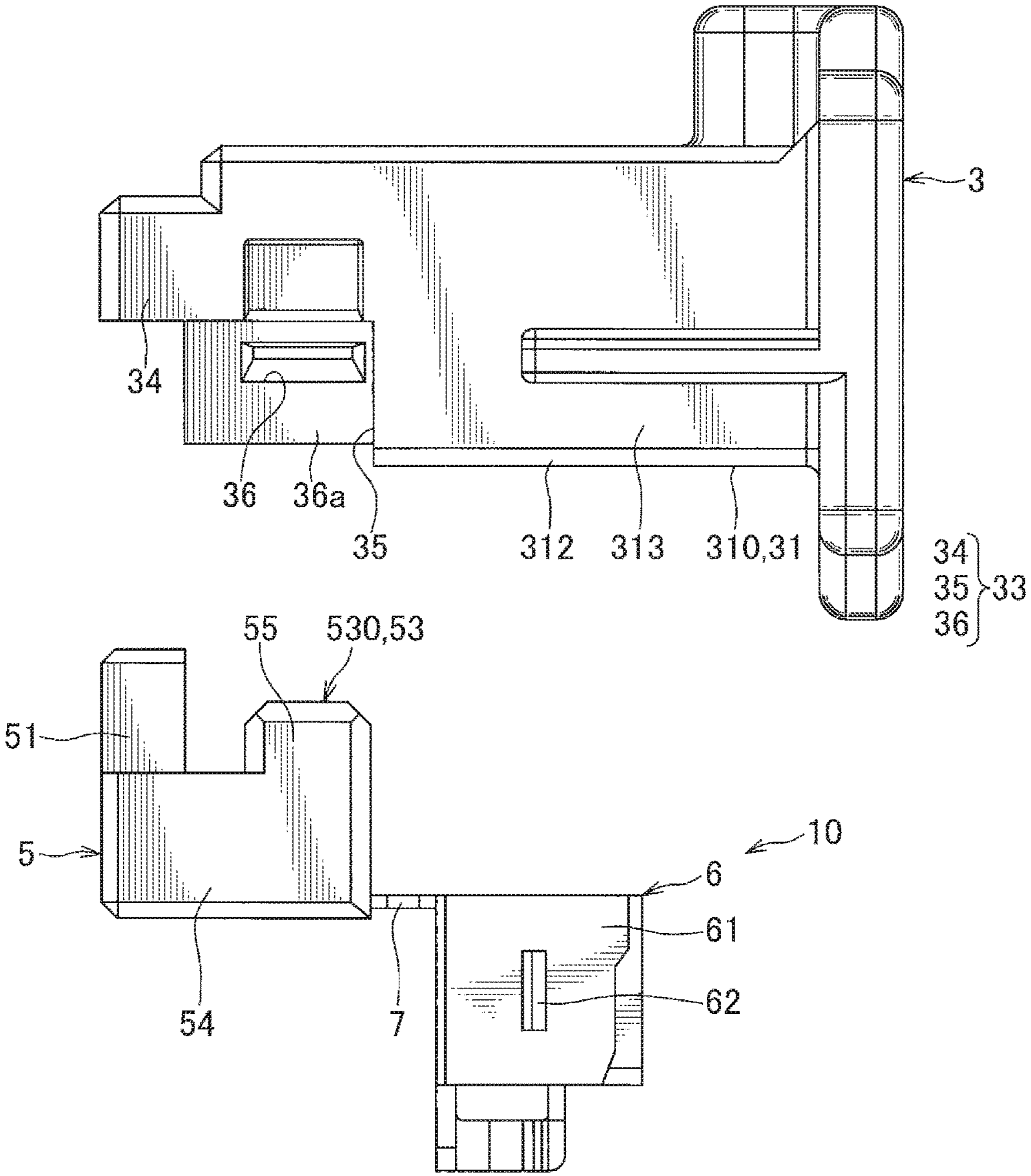
FIG. 5 shows a concept of the implementation according to FIG. 4 in a schematic lateral view.
Figure 6:
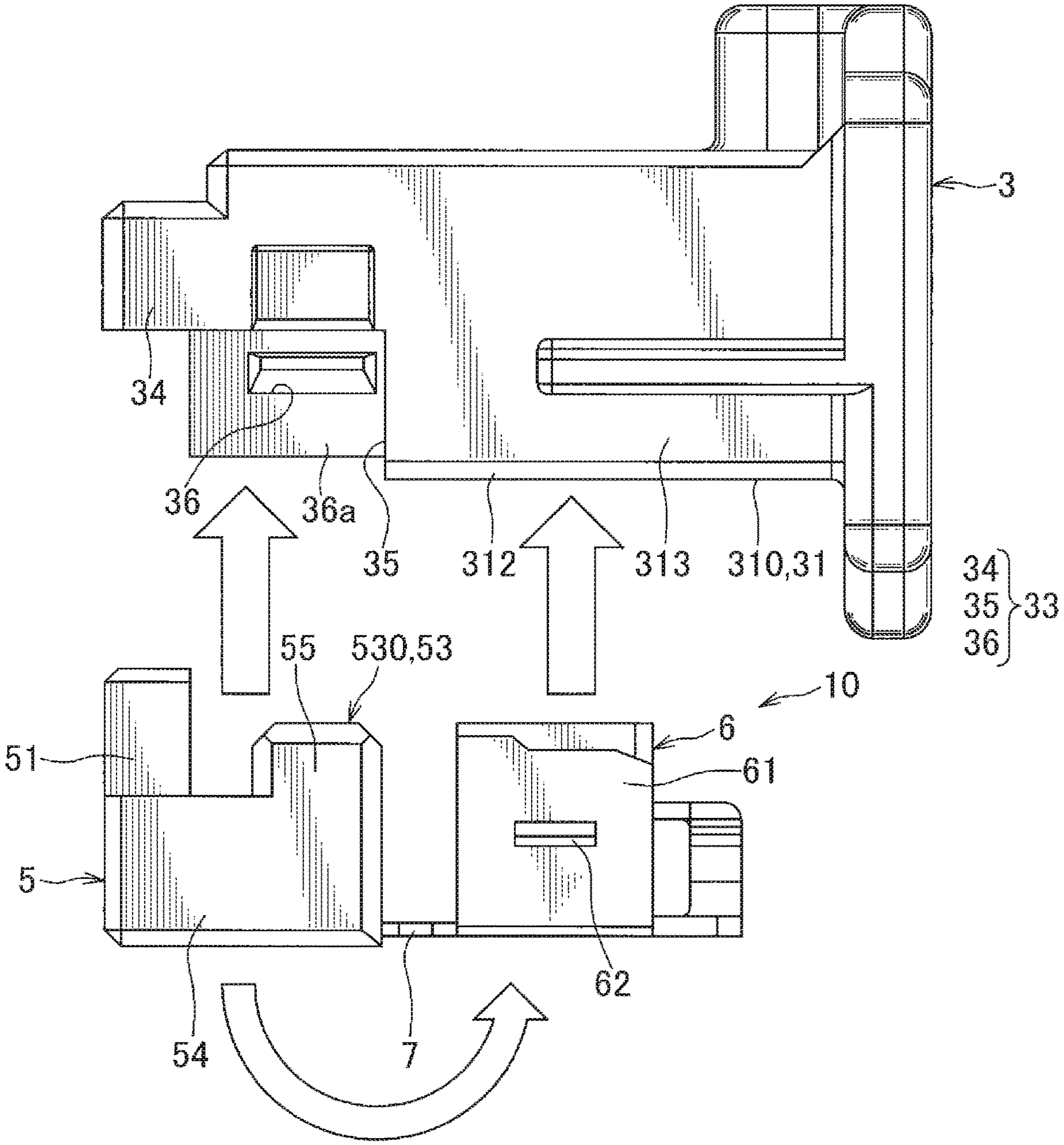
FIG. 6 shows a schematic lateral view of a concept how the mounting member is mounted to the housing.
Figure 7:
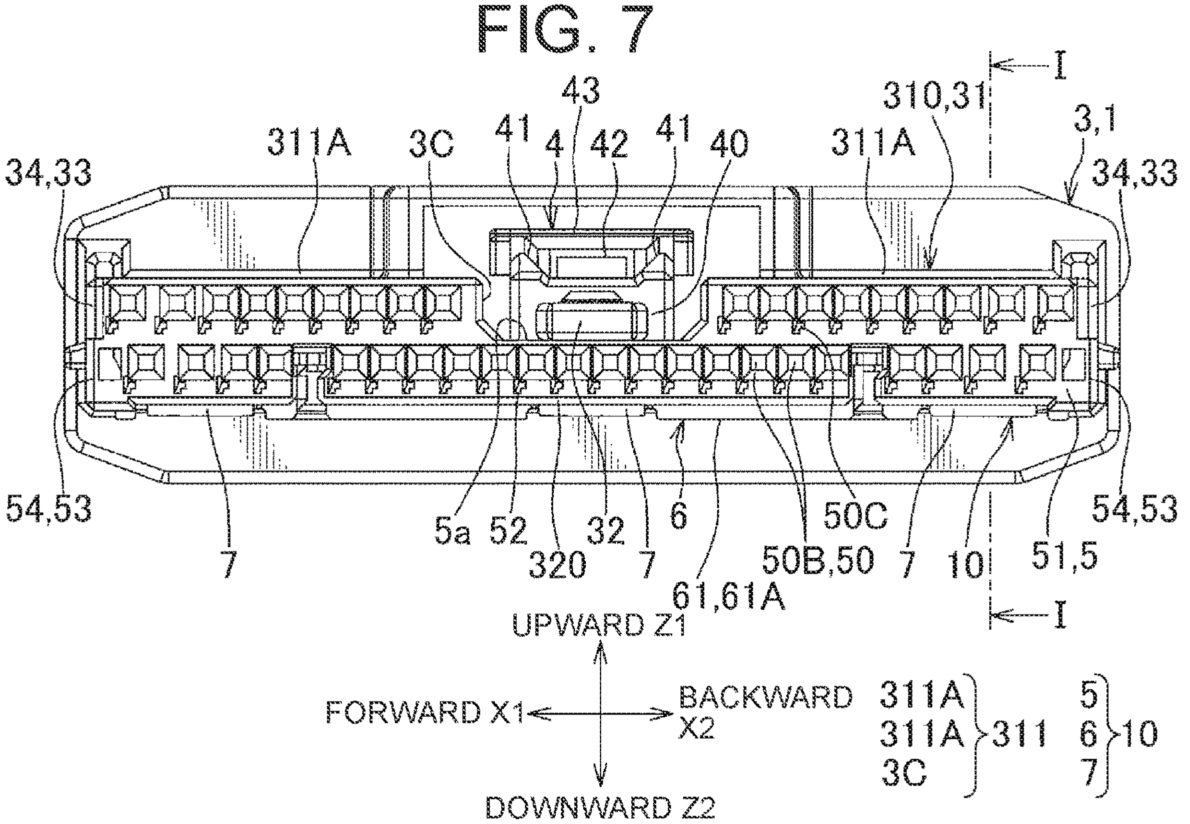
FIG. 7 is a front view of the connector illustrating that the spacer is positioned in a temporary locked position.

First, core wires of electric wires 11 are connected to the core wire connecting sections 22 of the female terminals 2 via crimping, and coating sections 11B of the electric wires 11 are connected to the coating connecting sections 23 of the female terminals 2 via crimping in advance. Further, the hinges 7 are bent from the state as shown in FIGS. 4 and 5 to pivot the spacer main body 61 so that the state as shown in FIG. 6 is obtained. Next, as shown in FIG. 6, a tip of the insertion protrusion 52 is brought close to the insertion hole 320 in the housing 3 from below, with the mask main body 51 of the mounting member 10 facing the front end face of the housing main body 31, and the insertion protrusion 52 is then inserted into the insertion hole 320, wherein the spacer main body 61 is brought close to the opening 316 in the housing main body 31 and then inserted into the spacer insertion space 3B. By further inserting the insertion protrusion 52, the engaged portion main bodies 530 of the engaged portions 53 are fitted in the cut-out portions 35 in the counter-engaged portions 33 and the engagement projections 56 are engaged with the engagement recesses 36. At this time, the terminal hole portions 50 in the mask main body 51 are thus located in the positions facing the forward X1 side of the respective terminal accommodating chambers 3A in the housing 3. In this manner, the front mask 5 is mounted to the housing 3. Furthermore, the spacer main body 61 is further inserted so that the pair of locked protrusions 62, 62 lock the temporary counter-locking portions of the housing 3, whereby the spacer 6 is positioned in the temporary locked position, as shown in FIGS. 7 and 8.

Subsequently, the front ends of the female terminals 2 are brought close to and inserted into the back ends of the respective terminal accommodating chambers 3A of the housing main body 31, as shown in FIG. 8. By further inserting the female terminals 2, their front ends come into contact with the lances 37 and bend the lances 37. By further inserting the female terminals 2, the tips of the female terminals 2 are accommodated in the accommodating recesses 50A in the front mask 5 so that the lances 37 are returned to their natural state to lock the lance receiving portions 20 of the female terminals 2. In this manner, the female terminals 2 are accommodated in the respective terminal accommodating chambers 3A.

Figure 9:
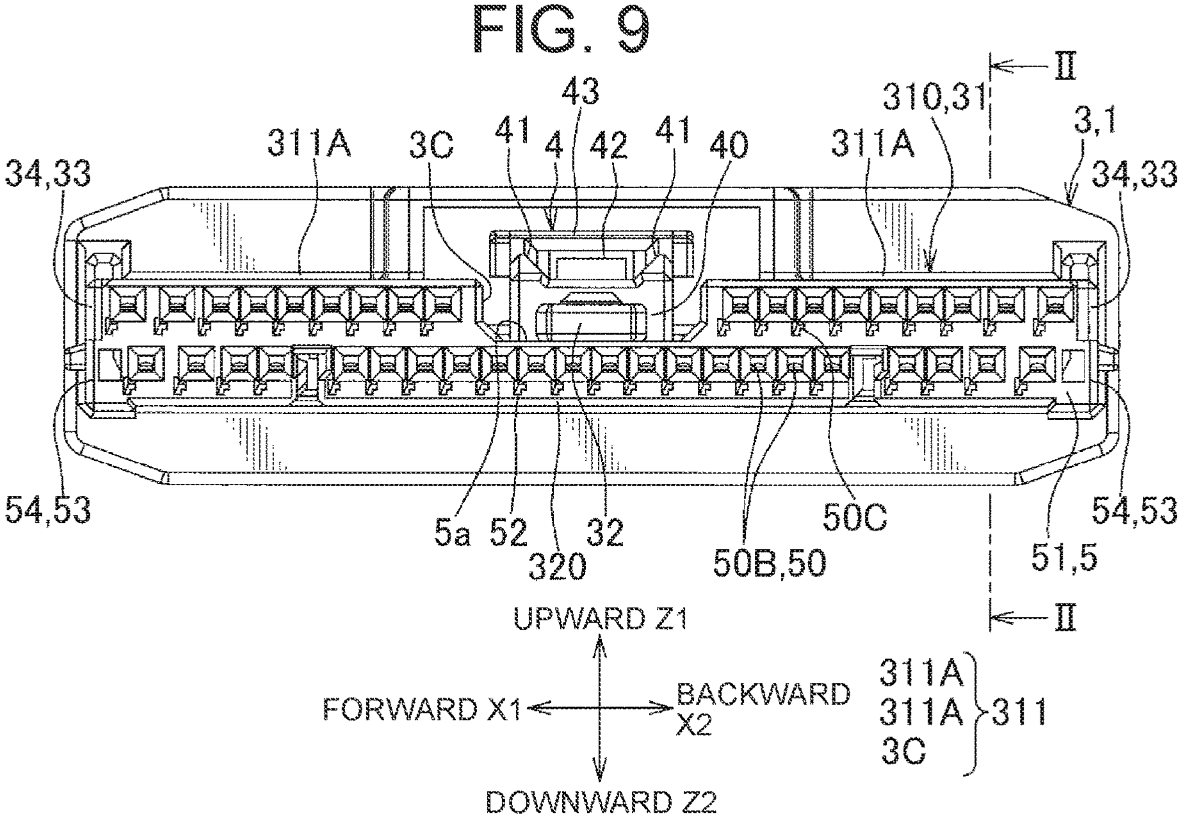
FIG. 9 is a front view of the connector illustrating that the spacer is positioned in a final locked position.

Thereafter, the spacer 6 is further inserted deeper into the spacer insertion space 3B in the housing main body 31. With the further insertion, the hinges 7 are extended from the curved state and the pair of locked protrusions 62, 62 lock the final counter-locking portions of the housing 3 as shown in FIGS. 9 and 10, so that the spacer 6 is positioned in the final locked position. At this time, the hinges 7 are brought into the state where they do not protrude from the lower wall 312 of the housing main body 31, wherein the lower face 61A of the spacer main body 61 is positioned further upward Z1 than the lower wall 312 of the housing main body 31. Furthermore, the terminal locking sections 63 of the spacer 6 lock the female terminals 2 accommodated in the terminal accommodating chambers 3A to prevent the female terminals 2 from being removed from the terminal accommodating chambers 3A, so that each of the female terminals 2 is double-locked by the lance 37 and the spacer 6. In this manner, the connector 1 is assembled.

The embodiment as described above provides the housing 3 with the terminal accommodating chambers 3A for inserting the female terminals 2 (terminal) therein; and the mounting member 10 configured to be mounted to the housing 3, wherein the mounting member 10 includes: the front mask 5 configured to cover the forward X1 (terminal inserting direction) side of the housing 3 on which the female terminals 2 are inserted into the housing 3; the spacer 6 configured to be inserted into the housing 3; and the hinges 7 coupling the front mask 5 to the spacer 6, wherein the spacer 6 is configured to be locked in the housing 3 in the temporary locked position and the final locked position of the housing 3, the final locked position being located further upward Z1 (deeper in the housing 3 in the inserting direction) than the temporary locked position, and wherein in the state where the spacer 6 is positioned in the final locked position, the hinges 7 are configured not to protrude from the housing 3. According to this embodiment, in the state of the spacer 6 being in the temporary locked position, the hinges 7 are configured not to protrude from the housing 3, whereby it can be prevented that an external force is applied to the hinges 7 of the connector 1 when handling a wire harness with the connector 1 e.g. in transportation. This enables the hinges 7 to be prevented from being damaged.

Further, in the state of the spacer 6 being in the final locked position, the lower face 61A of the spacer main body 61 is positioned further upward Z1 than the lower wall 312 of the housing main body 31. This means that the spacer 6 is configured not to protrude from the housing 3 in the state of the spacer 6 being in the final locked position. This enables the hinges 7 to be prevented from being damaged while allowing the finished connector 1 to be miniaturized by a degree which would be otherwise added in the case of the spacer 6 protruding from the housing 3.

It is to be noted that the present invention is not limited to the embodiment as described above, but includes other embodiments and the like which can achieve the objective of the present invention, including other variations or the like such as the following ones:

Although the lower face 61A of the spacer main body 61 according to the embodiment as described above is positioned further upward Z1 than the lower wall 312 of the housing main body 31 when the spacer 6 is positioned in the final locked position, the present invention is not limited thereto. It may be configured such that when the spacer 6 is positioned in the final locked position, the lower face 61A of the spacer main body 61 positioned substantially at the same height position as the lower wall 312 of the housing main body 31. In other words, the scope of the present invention shall include all embodiments in which when the spacer 6 is positioned in the final locked position, the spacer main body 61 is configured not to protrude from the lower wall 312 of the housing main body 31.

Although the best configuration, method etc. for implementing the present invention are disclosed in the above description, the present invention is not limited thereto. Namely, while the present invention is particularly shown and described mainly with regard to the specific embodiments, the above mentioned embodiments may be modified in various manners in shape, material characteristics, amount or other detailed features by those skilled in the art without departing from the scope of the technical idea and purpose of the present invention. Therefore, the description with limited shapes, material characteristics etc. according to the above disclosure is not limiting the present invention, but merely illustrative for easier understanding the present invention so that the description using names of the elements without a part or all of the limitations to their shapes, material characteristics etc. is also included in the present invention.

REFERENCE SIGNS LIST

1 Connector
2 Female terminals (terminals)
3 Housing
3A Terminal accommodating chambers
5 Front mask
6 Spacer
7 Hinges
10 Mounting member
X1 Forward (terminal inserting direction)

What is claimed is:

1. A connector comprising:
a housing including a terminal accommodating chamber for inserting a terminal therein; and
a mounting member configured to be mounted to the housing,
wherein the mounting member includes:
a front mask configured to cover a side of the housing in a terminal inserting direction on which the terminal is inserted into the housing;
a spacer configured to be inserted into the housing and positioned more inward in the housing than the front mask; and
a hinge coupling the front mask to the spacer,
wherein the spacer is configured to be locked in the housing in a temporary locked position and a final locked position of the housing, the final locked position being located deeper in the housing in an inserting direction than the temporary locked position, and
wherein in a state where the spacer is positioned in the final locked position, the hinge is configured not to protrude from the housing.

2. The connector according to claim 1,
wherein in the state where the spacer is positioned in the final locked position, the spacer is configured not to protrude from the housing.

3. The connector according to claim 1,
wherein the spacer is configured to be inserted into the housing in a direction perpendicular to the terminal inserting direction.

* * * * *